United States Patent
Lee et al.

(10) Patent No.: US 12,152,659 B2
(45) Date of Patent: Nov. 26, 2024

(54) DRIVING TORQUE DISTRIBUTION APPARATUS

(71) Applicants: Hyundai Motor Company, Seoul (KR); Kia Corporation, Seoul (KR); HYUNDAI WIA CORPORATION, Changwon-si (KR)

(72) Inventors: Taewoo Lee, Suwon-Si (KR); Jeong Won Song, Hwaseong-Si (KR); Sung Keun Lim, Hwaseong-Si (KR); JunSeok Park, Seoul (KR); Yeong Taek Lee, Changwon-Si (KR); Won Hee Hong, Changwon-Si (KR); Ji Seung Ryu, Hwaseong-Si (KR)

(73) Assignees: Hyundai Motor Company, Seoul (KR); Kia Corporation, Seoul (KR); Hyundai Wia Corporation, Changwon-si (KR)

( * ) Notice: Subject to any disclaimer, the term of this patent is extended or adjusted under 35 U.S.C. 154(b) by 0 days.

(21) Appl. No.: 18/388,754

(22) Filed: Nov. 10, 2023

(65) Prior Publication Data
US 2024/0218921 A1  Jul. 4, 2024

(30) Foreign Application Priority Data
Dec. 28, 2022  (KR) .......................... 10-2022-0186669

(51) Int. Cl.
*F16H 48/19* (2012.01)
*B60K 17/16* (2006.01)
*F16H 48/22* (2006.01)
*F16H 48/34* (2012.01)

(52) U.S. Cl.
CPC ........... *F16H 48/19* (2013.01); *B60K 17/165* (2013.01); *F16H 48/22* (2013.01); *F16H 48/34* (2013.01); *F16H 2048/343* (2013.01)

(58) Field of Classification Search
CPC .......... F16H 48/19; F16H 48/22; F16H 48/34; F16H 2048/343; B60K 17/165
USPC ........................................................... 74/650
See application file for complete search history.

(56) References Cited

U.S. PATENT DOCUMENTS

| 3,089,574 | A | * | 5/1963 | Howard | F16H 3/14 |
| | | | | | 192/96 |
| 4,878,571 | A | * | 11/1989 | Sacher | F16D 13/04 |
| | | | | | 192/48.91 |
| 5,547,431 | A | * | 8/1996 | Sommer | F16H 3/56 |
| | | | | | 475/156 |

(Continued)

*Primary Examiner* — Ha Dinh Ho
(74) *Attorney, Agent, or Firm* — Morgan, Lewis & Bockius LLP

(57) ABSTRACT

A driving torque distribution apparatus has a rapid response speed by applying a ball ramp device including a ball which is rolling-supported between a worm wheel rotated by a worm gear and a cam ring fixed in a rotation direction, and configured to generate an axial directional pressurizing force in conjunction with the rotation of the worm wheel, as first and second operation units to control first and second clutch units, and is configured so that an axial directional load due to pressurizing forces of the first and second operation units is canceled within each drum by a snap ring and a spacer fixed to internal and external sides of each drum of the first and second clutch units, preventing an interface between axial directional loads acting on the first and second clutch units.

16 Claims, 5 Drawing Sheets

(56) References Cited

U.S. PATENT DOCUMENTS

| | | | |
|---|---|---|---|
| 9,033,126 B2* | 5/2015 | Strong | F16D 13/16 192/48.91 |
| 2024/0218921 A1* | 7/2024 | Lee | F16D 28/00 |

* cited by examiner

DRIVING TORQUE DISTRIBUTION APPARATUS

CROSS-REFERENCE TO RELATED APPLICATION

The present application claims priority to Korean Patent Application No. 10-2022-0186669 filed on Dec. 28, 2022, the entire contents of which is incorporated herein for all purposes by this reference.

BACKGROUND OF THE PRESENT DISCLOSURE

Field of the Present Disclosure

The present disclosure relates to a driving torque distribution apparatus. More particularly, the present disclosure relates to a driving torque distribution apparatus that distributes a driving torque of a power source to left and right wheels though a pair of clutch units configured in a case of an axle for an electric vehicle and driven independently.

Description of Related Art

In general, when a driving torque distribution apparatus of a vehicle distributes a driving force to left and right wheels, each driving force may be independently transmitted to enable a fine handling control of the vehicle, desired by a driver.

For example, when the vehicle performs a turning driving, an understeer phenomenon may occur in the vehicle due to a centrifugal force. However, it is possible to suppress the understeer phenomenon by increasing the driving force acting on a turning external wheel.

That is, in a case where the driving force acting on the turning external wheel is sufficient while the vehicle performs the turning driving, the vehicle may perform the turning driving without occurrence of the understeer phenomenon even at a higher speed than that of a general vehicle.

To improve the handling and traction performance of the vehicle, the driving torque distribution apparatus may have a tendency to be applied as a twin clutch coupling module (TCCM) type which may independently control a driving force of a driving source by including left and right clutches separately positioned in a rear axle of a drive system of a rear-wheel-drive vehicle, a four-wheel-drive vehicle, an all-wheel-drive (AWD) vehicle, an electric vehicle or the like.

Accordingly, the vehicle mounting the driving torque distribution apparatus therein may perform a more stable and dynamic driving than the general vehicle.

It is important to accurately and precisely transmit a torque for each driving condition to promote driving stability of the vehicle through the driving force distribution desired by the driver, and key technology of the driving torque distribution apparatus is to design the left and right driving forces not to interfere with each other.

However, the driving torque distribution apparatus applied to the conventional power transmission apparatus has a limitation in response speed as a pressing method using hydraulic pressure is applied to operate and control the clutch, which makes it difficult to transmit accurate and precise torque for each driving condition of the vehicle.

That is, the hydraulic clutch requires time to fill the hydraulic volume by operating the piston after filling the cylinder with oil using the actuator (motor and pump), which causes a relatively long time to be consumed in an initial period (i.e., low pressure period) to reach the requested pressure due to the nature of the hydraulic mechanism.

On the other hand, recently, as the performance required for vehicles is increasing, when the maximum torque required is increased, this may be a factor that further increases the response time of the hydraulic clutch, and such a hydraulic clutch may be a cause to deteriorates the performance of the electric vehicle.

That is, when the reaction speed of the clutch that connects power is slow compared to the fast response speed of the main drive motor of the electric vehicle, the clutch fails to fully transmit torque and slip may occur.

At the present time, excessive slip of the clutch not only deteriorates the performance of the clutch, but also causes problems in durability due to abnormal wear of the clutch. Accordingly, to improve driving performance of an electric vehicle, shortening the response speed of the clutch is an important factor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving torque distribution apparatus having a rapid response speed by applying a ball ramp device including a ball which is rolling-supported between a worm wheel rotated by a worm gear and a cam ring fixed in a rotation direction, and configured to generate an axial directional pressurizing force in conjunction with the rotation of the worm wheel, as first and second operation units to control first and second clutch units.

The present disclosure attempts to provide a driving torque distribution apparatus in which an axial directional load due to pressurizing forces of the first and second operation units is canceled within each drum by a snap ring and a spacer fixed to internal and external sides of each drum of the first and second clutch units, preventing an interface between axial directional loads acting on the first and second clutch units.

The present disclosure attempts to provide a driving torque distribution apparatus in which the first and second clutch units are structured to connect the first and second drums through the drum connector 30 so that the clutch units may be manufactured by assembling, providing each manufacturing and improving maintainability.

A driving torque distribution apparatus, in which first and second clutch units configured on axes of first and second driveshafts within a case of an axle of a vehicle are controlled by first and second operation units, respectively, to independently distribute a driving torque transmitted through a drive gear to the first and second driveshafts, where, in the first clutch unit, the drive gear is spline-coupled to a frontal end portion of a first drum through an extension end portion formed outward in an axial direction thereof to be movable in the axial direction, and where the first and second operation units include a ball ramp device configured to form a plurality of grooves having inclined depths in opposite directions on corresponding cross-sections of a worm wheel rotated by a worm gear and a cam ring fixed in a rotation direction, and generate an axial directional pressurizing force in conjunction with rotation of the worm wheel as a ball is rolling-supported by a groove between the worm wheel and the cam ring.

In the first and second clutch units, first and second drums may be interconnected through a drum connector, and first and second hubs are spline-coupled to the first and second driveshafts, respectively.

The drum connector may be spline-coupled to an external circumference of each internal end portion of the first and second drums.

The first and second clutch units may include first and second separating plates supported through a snap ring on an internal circumference of each internal side of first and second drums to support pressurizing force of the first and second operation units, and the first and second operation units may include a spacer supported by an external diameter surface of each external side of the first and second drums to support the axial directional pressurizing force generated by cam-operation of the ball with respect to the inclined groove between the worm wheel and the cam ring.

The first clutch unit may include the first drum disposed in parallel on an external circumference of a first driveshaft, and spline-coupled to the drive gear through the extension end portion extending in the axial direction at an external frontal end portion, a first hub spline-coupled to the first driveshaft in an interior of the first drum and including an external frontal end portion rolling-supported by the first drum through a bearing, a plurality of first clutch plates spline-coupled to an internal circumference of the first drum, a plurality of first clutch disks disposed between the plurality of first clutch plates and spline-coupled to an external circumference of the first hub, a first separating plate corresponding to the second clutch unit, spline-coupled to an internal side of the internal circumference of the first drum to be supported inward in the axial direction through a snap ring, and including a central circumference rolling-supported by an internal surface of the first hub through a bearing, and a first pressurizing plate spline-coupled to an external side of the internal circumference of the first drum.

The first operation unit may include a spacer corresponding to the first clutch unit, fitted with an external circumference of external to the frontal end portion of the first drum, and supported outward in the axial direction by a catching step, the worm wheel fitted with an external circumference of the first drum to be engaged with the worm gear configured to transfer a torque of an actuator, and having an external cross-section on which a plurality of grooves having a depth inclined in one direction is formed along a circular arc direction, the cam ring fixed in the rotation direction and supported by the spacer in a state of being fitted with the external circumference of the first drum together with the worm wheel, and having an internal cross-section facing the worm wheel on which a plurality of grooves having a depth inclined in a direction opposite to the groove on the worm wheel are formed along a circular arc direction, the ball rolling-supported by each groove between the worm wheel and the cam ring to cam-operate in conjunction with the rotation of the worm wheel, a push plate fitted with the external circumference of the first drum, having an external cross-section rolling-supported by an internal cross-section of the worm wheel through a bearing, having an internal cross-section along which a plurality of pushrods are formed to penetrate a side surface of the first drum, and disposed to face the first pressurizing plate, and a wave spring located between the side surface of the first drum and the push plate and configured to provide restoring force to the push plate.

A bearing may be located between the cam ring and the spacer.

The second clutch unit may include a second drum disposed in parallel on an external circumference of the second driveshaft, and including an external frontal end portion rolling-supported by an internal surface of a cover through a bearing, a second hub spline-coupled to the second driveshaft in an interior of the second drum, and including an external frontal end portion rolling-supported by the second drum through a bearing, a plurality of second clutch plates spline-coupled to an internal circumference of the second drum, a plurality of second clutch disks disposed between the plurality of second clutch plates and spline-coupled to an external circumference of the second hub, a second separating plate corresponding to the first clutch unit, spline-coupled to an internal side of the internal circumference of the second drum to be supported inward in the axial direction through a snap ring, and including a central circumference rolling-supported by an internal surface of the second hub through a bearing, and a second pressurizing plate spline-coupled to an external side of the internal circumference of the second drum.

The second operation unit may include a spacer corresponding to the second clutch unit, fitted with an external circumference of an external frontal end portion of the second drum, and supported outward in the axial direction by a catching step, the worm wheel fitted with an external circumference of the second drum to be engaged with the worm gear configured to transfer a torque of an actuator, and having an external cross-section on which a plurality of grooves having a depth inclined in one direction is formed along a circular arc direction, the cam ring fixed in the rotation direction and supported by the spacer in a state of being fitted with the external circumference of the second drum together with the worm wheel, and having an internal cross-section facing the worm wheel on which a plurality of grooves having a depth inclined in a direction opposite to the groove on the worm wheel are formed along a circular arc direction, the ball rolling-supported by each groove between the worm wheel and the cam ring to cam-operate in conjunction with the rotation of the worm wheel, a push plate fitted with the external circumference of the second drum, having an external cross-section rolling-supported by an internal cross-section of the worm wheel through a bearing, having an internal cross-section along which a plurality of pushrods are formed to penetrate a side surface of the second drum, and disposed to face the second pressurizing plate, and a wave spring located between the side surface of the second drum and the push plate and configured to provide restoring force to the push plate.

A bearing may be located between the cam ring and the spacer.

A driving torque distribution apparatus according to various exemplary embodiments of the present disclosure may include a rapid response speed by applying a ball ramp device including a ball which is rolling-supported between a worm wheel rotated by a worm gear and a cam ring fixed in a rotation direction, and configured to generate an axial directional pressurizing force in conjunction with the rotation of the worm wheel, as first and second operation units to control first and second clutch units.

Due to rapid response speed of the first and second clutch units, driving performance of the electric vehicle may be improved and performance on traction, handling, and vehicle behavior stability, which are features of a torque vectoring system may also be improved.

The axial directional load due to the pressurizing force of the first and second operation units are cancelled within the drums by the snap ring and the spacers fixed at the internal side and external side of the drums of the first and second clutch units, and therefore the first and second clutch units may be controlled without an interference of the axial directional load.

Accordingly, fatigue in the internal bearings may be reduced, a torque transmitted to both wheels may be accurately controlled, and driving stability of the vehicle may be improved while preventing unnecessary loss of driving force.

Furthermore, the first and second clutch units are structured to connect the first and second drums through the drum connector 30 so that the clutch units may be manufactured by assembling, providing each manufacturing and improving maintainability.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
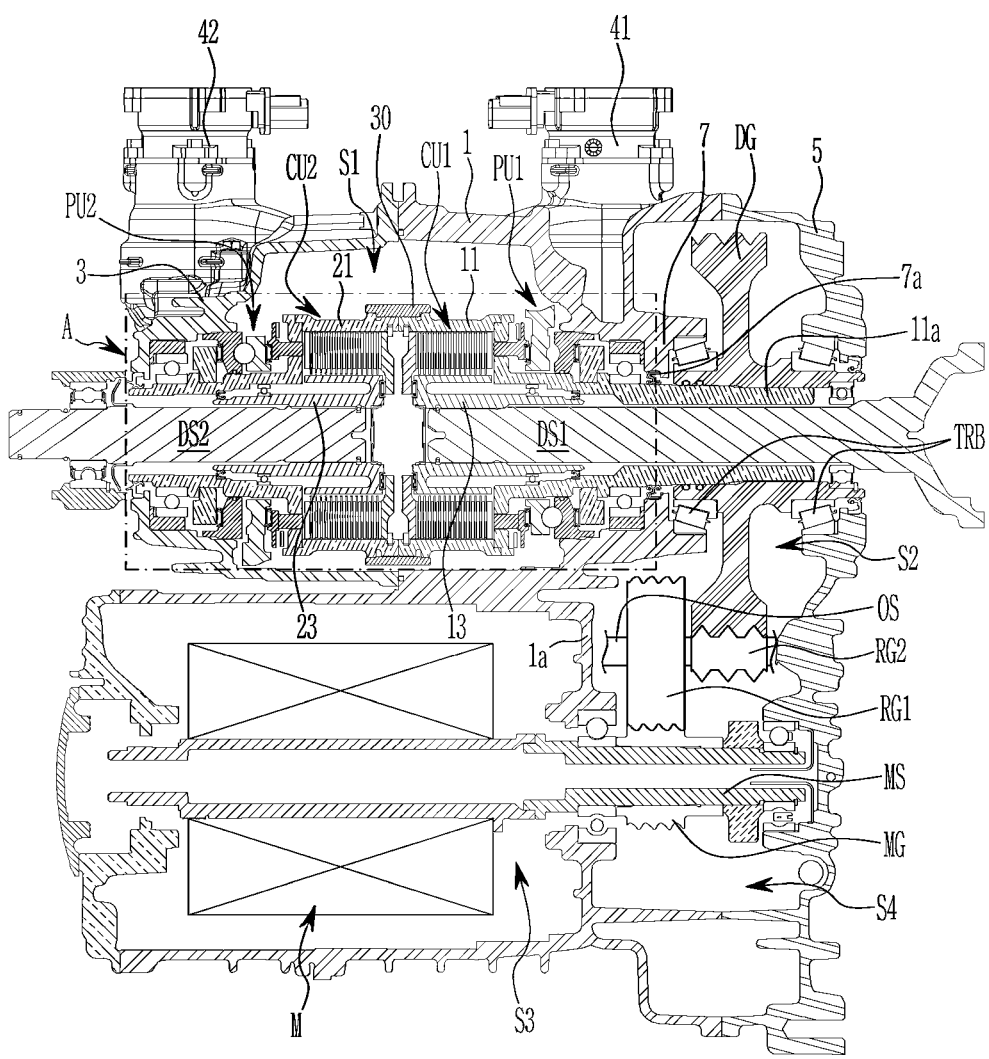
FIG. 1 is an entire cross-sectional view of a driving torque distribution apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a various exemplary embodiments of the present disclosure will be described in detail through the accompanying drawings.

However, to clearly describe the exemplary embodiments of the present disclosure, parts irrelevant to the description are omitted, and the same reference numerals are assigned to the same or similar components throughout the specification for description.

In the following description, the names of the components are divided into first, second, etc. To distinguish them because the names of the components are the same, and are not necessarily limited to the order.

Figure 2:
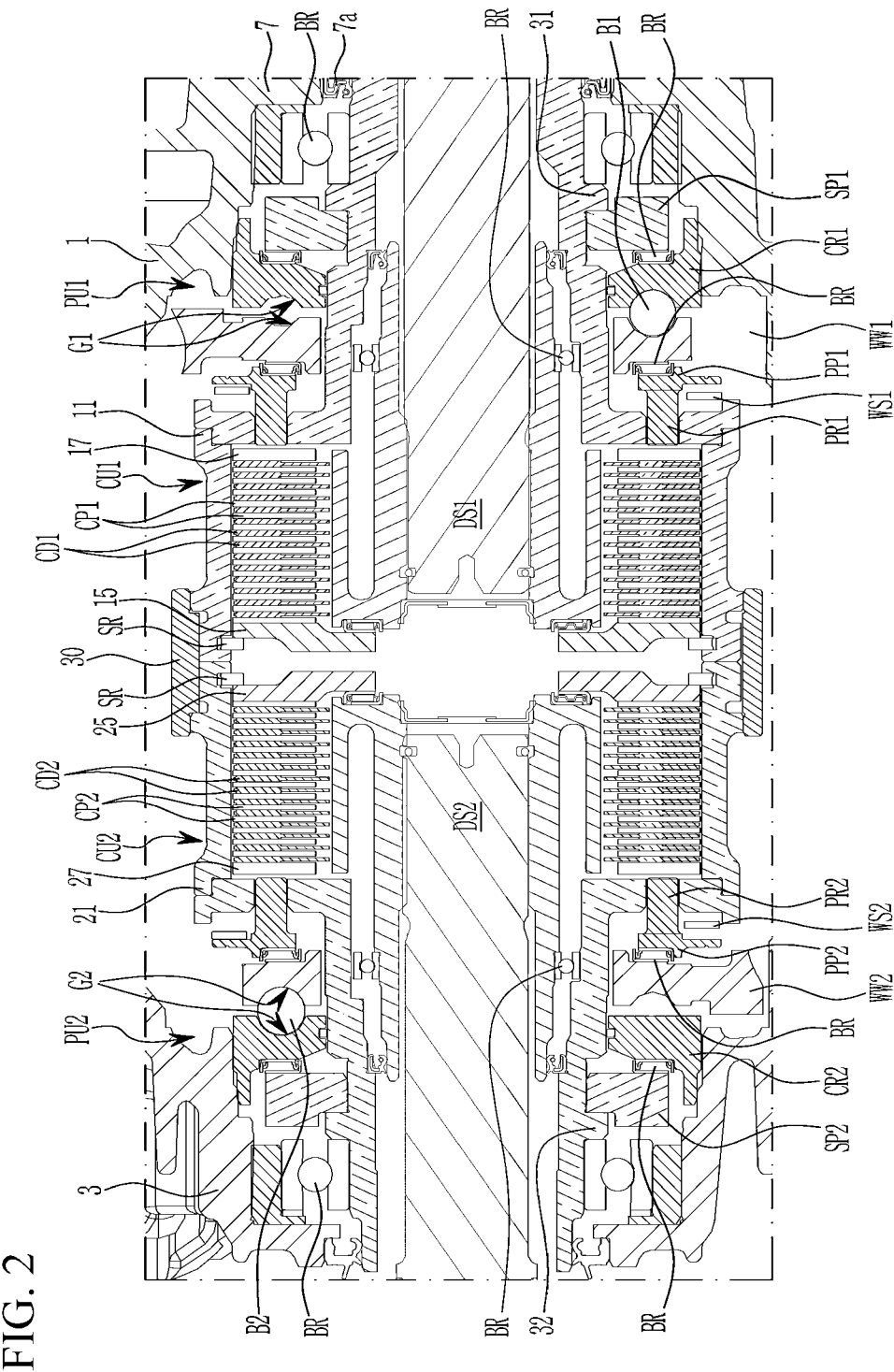
FIG. 2 is an enlarged cross-sectional view of portion A of FIG. 1.
Figure 3:
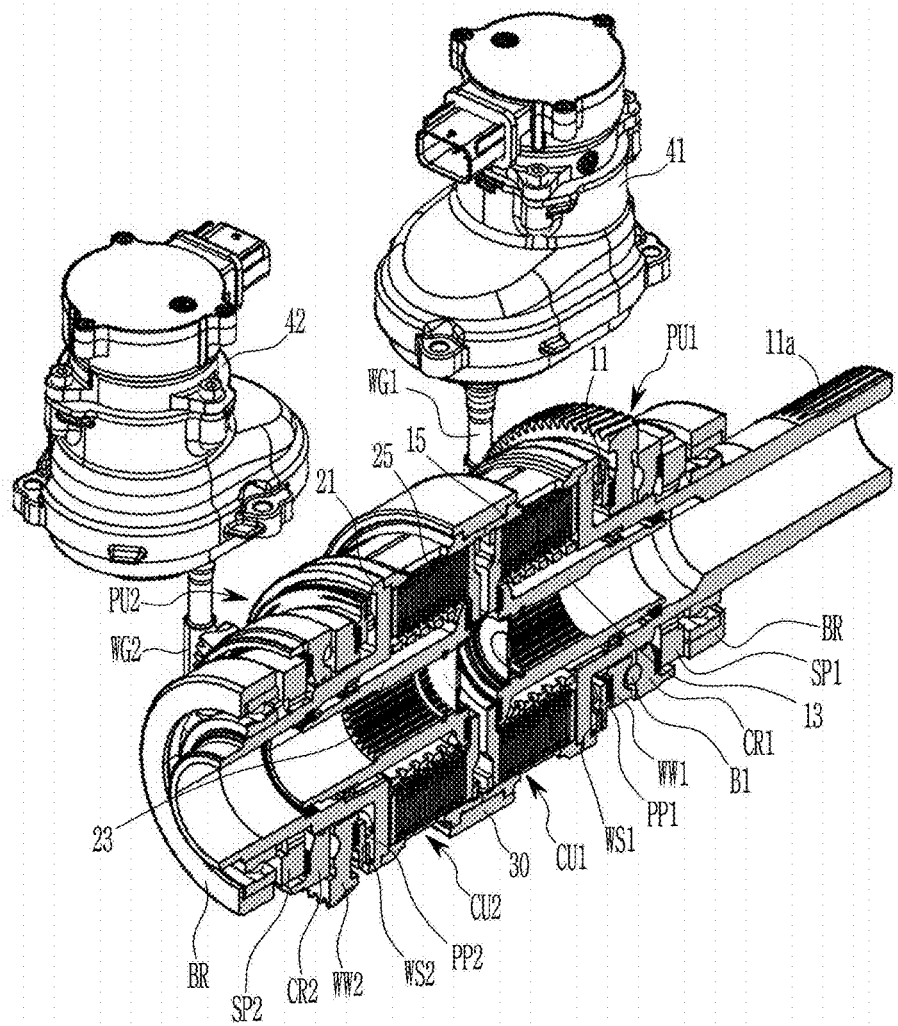
FIG. 3 is a cross-sectional view of first and second clutch units and first and second operation units applied to a driving torque distribution apparatus according to an exemplary embodiment of the present disclosure.

FIG. 1 is an entire cross-sectional view of a driving torque distribution apparatus according to an exemplary embodiment of the present disclosure. FIG. 2 is an enlarged cross-sectional view of portion A of FIG. 1. FIG. 3 is a cross-sectional view of first and second clutch units and first and second operation units applied to a driving torque distribution apparatus according to an exemplary embodiment of the present disclosure.

Referring to FIG. 1, the driving torque distribution apparatus according to various exemplary embodiments of the present disclosure may be positioned in a case 1 and a cover 3 of an axle for a vehicle. That is, driving torque of a motor M as a power source is transmitted to a drive gear DG through two-stage reduction gears RG1 and RG2, and as first and second clutch units CU1 and CU2 disposed on first and second driveshafts DS1 and DS2 are controlled by first and second operation units PU1 and PU2 respectively, the driving torque is distributed to the first and second driveshafts DS1 and DS2.

The two-stage reduction gears RG1 and RG2 include first and second reduction gears RG1 and RG2 configured adjacent on an output shaft OS provided between an internal wall 1a and a gear cover 5 within the case 1 through a bearing BR.

A first reduction gear RG1 is externally meshed with a motor gear MG on a motor shaft MS, and a second reduction gear RG2 is externally meshed with the drive gear DG.

At the present time, in the two-stage reduction gears RG1 and RG2, the first reduction gear RG1 has a larger diameter in comparison to the motor gear MG, and the second reduction gear RG2 has a smaller diameter in comparison to the drive gear DG so that the driving torque of the motor M is speed-reduced in two stages and transmitted to the drive gear DG.

Referring to FIG. 1 and FIG. 2, in an exemplary embodiment of the present disclosure, the first and second driveshafts DS1 and DS2, the first and second clutch units CU1 and CU2, and the first and second operation units PU1 and PU2 are shown at right side and left side, but it is not limited thereto, and may be opposite depending on viewing direction, and first, second, and the like does not limit the position.

The driving torque distribution apparatus may be applied in the axle of a driving system such as a rear-wheel-drive vehicle, a four-wheel-drive vehicle, an all-wheel-drive (AWD) vehicle, an electric vehicle or the like, and may be provided as a twin clutch coupling module (TCCM) type which may independently control the driving force from the driving source to a rear wheel or all wheels.

A space S1 in which the first and second clutch units CU1 and CU2 and the first and second operation units PU1 and PU2 are provided is formed in an internal between the case 1 and the cover 3, and a space S2 in which the drive gear DG is provided is formed in an internal between the case 1 and the gear cover 5.

Furthermore, the case 1 may be partitioned, with reference to the internal wall 1a, into a space S3 in which the motor M as a power source is provided and a space S4 in which the motor gear MG and the first and second reduction gears RG1 and RG2 are provided.

The gear cover 5 is configured for protecting the motor gear MG, the first and second reduction gears RG1 and RG2, and the drive gear DG.

The power source may be formed of an internal combustion engine that burns fossil fuel or a motor M that utilizes electrical energy, and although an exemplary embodiment takes an example of using the motor M, but it is not limited thereto.

Here, the space S1 and the space S2 are partitioned by forming a sealing end portion 7 at an end portion of the case 1 corresponding to the gear cover 5 and mounting a sealing ring 7a.

A driving torque distribution apparatus according to an exemplary embodiment of the present disclosure includes the first and second clutch units CU1 and CU2 and the first and second operation units PU1 and PU2 configured on an external circumference side of the first and second driveshafts DS1 and DS2, respectively.

In the first clutch unit CU1, an extension end portion 11a is formed at a frontal end portion of a first drum 11 outward in the axial direction, one end portion of the extension end portion 11a maintains air-tightness with the sealing end portion 7 through the sealing ring 7a, and the drive gear DG is provided at the extension end portion 11a.

Furthermore, first and second drums 11 and 21 of the first and second clutch units CU1 and CU2 are interconnected through a drum connector 30, and first and second hubs 13 and 23 of the first and second clutch units CU1 and CU2 are spline-coupled to the first and second driveshafts DS1 and DS2, respectively.

Therefore, the driving torque of the motor M transferred to the drive gear DG is distributed to the first and second driveshafts DS1 and DS2 as the first and second clutch units CU1 and CU2 are independently controlled by an axial directional pressurizing force activated by the first and second operation units PU1 and PU2.

Hereinafter, the first and second clutch units CU1 and CU2, and the first and second operation units PU1 and PU2, which are major constituent elements of a driving torque distribution apparatus according to an exemplary embodiment of the present disclosure, are described in detail with reference to FIG. 2 and FIG. 3.

First, the first clutch unit CU1 includes the first drum 11, a first hub 13, a plurality of first clutch plates CP1 configured between the first drum 11 and the first hub 13, a plurality of first clutch disks CD1, a first separating plate 15, and a first pressurizing plate 17.

The first drum 11 is disposed on a first driveshaft DS1 in parallel in the axial direction, and includes an external frontal end portion on which the extension end portion 11a extending in the axial direction is formed. At the instant time, the drive gear DG is spline-coupled to an external circumference of the extension end portion 11a to be movable in the axial direction thereof.

Furthermore, the drive gear DG has both sides rotatably provided to the sealing end portion 7 partitioning the space and the gear cover 5 of the external side, respectively, through a taper roller bearing TRB.

The first hub 13 is spline-coupled to the first driveshaft DS1, in an interior of the first drum 11. At the instant time, an external frontal end portion of the first hub 13 is rolling-supported by an internal side of the first drum 11 through the bearing BR.

Furthermore, the plurality of first clutch plates CP1 is spline-coupled to an internal circumference of the first drum 11 to rotate with the first drum 11, and the plurality of first clutch disks CD1 is disposed between the plurality of first clutch plates CP1 and spline-coupled to an external circumference of the first hub 13 to rotate with the first hub 13.

The first separating plate 15 is spline-coupled to an internal side of the internal circumference of the first drum 11, corresponding to a second clutch unit CU2, to be supported through a snap ring SR so as not to move inward in the axial direction. Furthermore, a central circumference of the first separating plate 15 is rolling-supported by an internal surface of the first hub 13 through the bearing BR.

The first pressurizing plate 17 is spline-coupled to an external side of the internal circumference of the first drum 11 and configured to evenly transfer a pressurizing force transmitted from a first operation unit PU1 to a first clutch plate CP1 and a first clutch disk CD1.

Furthermore, the second clutch unit CU2 includes a second drum 21, a second hub 23, a plurality of second clutch plates CP2 configured between the second drum 21 and the second hub 23, a plurality of second clutch disks CD2, a second separating plate 25, and a second pressurizing plate 27.

The second drum 21 is disposed on a second driveshaft DS2 in parallel in the axial direction, and includes an external frontal end portion rolling-supported by an internal surface of the cover 3 through the bearing BR.

The second drum 21 is connected to the first drum 11 through the drum connector 30, and the drum connector 30 is spline-coupled to an external circumference of each internal end portion of the first and second drums 11 and 21, to be configured for communicating power.

The second hub 23 is spline-coupled to the second driveshaft DS2, in an interior of the second drum 21. At the instant time, an external frontal end portion of the second hub 23 is rolling-supported by the second drum 21 through the bearing BR.

Furthermore, the plurality of second clutch plates CP2 is spline-coupled to an internal circumference of the second drum 21 to rotate with the second drum 21, and the plurality of second clutch disks CD2 is disposed between the plurality of second clutch plates CP2 and spline-coupled to an external circumference of the second hub 23 to rotate with the second hub 23.

The second separating plate 25 is spline-coupled to an internal side of the internal circumference of the second drum 21, corresponding to the first clutch unit CU1, to be supported through the snap ring SR so as not to move inward in the axial direction.

Furthermore, a central circumference of the second separating plate 25 is rolling-supported by an internal surface of the second hub 23 through the bearing BR.

The second pressurizing plate 27 is spline-coupled to an external side of the internal circumference of the second drum 21 and configured to evenly transfer a pressurizing force transmitted from a second operation unit PU2 to a second clutch plate CP2 and a second clutch disk CD2.

The first and second operation units PU1 and PU2 include a ball ramp device configured to form a plurality of grooves G1 and G2 having inclined depths in opposite directions on corresponding cross-sections of worm wheels WW1 and WW2 rotated by worm gears WG1 and WG2 and cam rings CR1 and CR2 fixed in the rotation direction, and generate the axial directional pressurizing force in conjunction with the rotation of the worm wheels WW1 and WW2 as balls B1 and B2 are rolling-supported by grooves G1 and G2 between the worm wheels WW1 and WW2 and the cam rings CR1 and CR2, respectively.

First, the first operation unit PU1 is configured on an external circumference of an external frontal end portion of the first drum 11, corresponding to the first clutch unit CU1, and includes a spacer SP1, a worm wheel WW1, a cam ring CR1, a ball B1, a push plate PP1, and a wave spring WS1.

The spacer SP1 is fitted with the external circumference of the external frontal end portion of the first drum 11, corresponding to the first clutch unit CU1, to be supported outward in the axial direction by a catching step 31.

Figure 4:
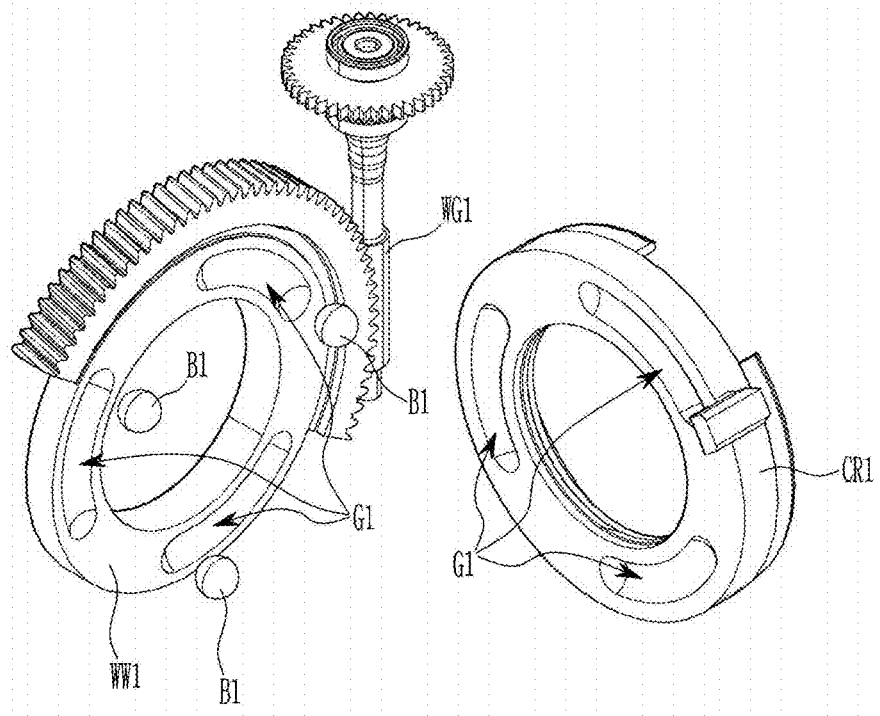
FIG. 4 an exploded perspective view of a first operation unit applied to a driving torque distribution apparatus according to an exemplary embodiment of the present disclosure.

FIG. 4 an exploded perspective view of a first operation unit applied to a driving torque distribution apparatus according to an exemplary embodiment of the present disclosure.

FIG. 4 is a drawing showing the worm wheel WW1 and the cam ring CR1 of the first operation unit PU1 unfolded, which configuration is also applied to the second operation unit PU2.

The worm wheel WW1 is in a state being fitted with an external circumference of the first drum 11, and engaged with a worm gear WG1 transferring a torque of an actuator 41. Furthermore, three grooves G1 having a depth inclined in one direction along a circular arc direction on the external cross-section is formed in the worm wheel WW1.

The cam ring CR1 is fixed in the rotation direction and supported by the spacer SP1 in a state of being fitted with the external circumference of the first drum 11 together with the worm wheel WW1. At the instant time, the bearing BR is located between the cam ring CR1 and the spacer SP1.

Furthermore, three grooves G1 having a depth inclined in an opposite direction to the groove G1 on the worm wheel WW1 along a circular arc direction on an internal cross-section facing the worm wheel WW1 is formed in the cam ring CR1.

The ball B1 is rolling-supported by the groove G1 between the worm wheel WW1 and the cam ring CR1, and configured to cam-operate in conjunction with the rotation of the worm wheel WW1.

The push plate PP1 is fitted with the external circumference of the first drum 11, and an external cross-section thereof is rolling-supported by internal cross-section of the worm wheel WW1 through the bearing BR. Furthermore, a plurality of pushrods PR1 are formed along an internal cross-section of the push plate PP1, and the pushrod PR1 is provided to penetrate a side surface of the first drum 11 and is disposed to face the first pressurizing plate 17.

The wave spring WS1 is located between the side surface of the first drum 11 and the push plate PP1, to provide restoring force to the push plate PP1.

The second operation unit PU2 includes the same configuration as the first operation unit PU1 and is configured to operate and control the second clutch unit CU2.

First, second operation units PU2 is configured on an external circumference of an external frontal end portion of the second drum 21, corresponding to the second clutch unit CU2, and includes a spacer SP2, a worm wheel WW2, a cam ring CR2, a ball B2, a push plate PP2, and a wave spring WS2.

The spacer SP2 is fitted with the external circumference of the external frontal end portion of the second drum 21, corresponding to the second clutch unit CU2, to be supported outward in the axial direction by a catching step 32.

The worm wheel WW2 is in a state being fitted with an external circumference of the second drum 21, and engaged with a worm gear WG2 transferring a torque of an actuator 42. Furthermore, three grooves G2 having a depth inclined in one direction along a circular arc direction on the external cross-section is formed in the worm wheel WW2.

The cam ring CR2 is fixed in the rotation direction and supported by the spacer SP2 in a state of being fitted with the external circumference of the second drum 21 together with the worm wheel WW2. At the instant time, the bearing BR is located between the cam ring CR2 and the spacer SP2.

Furthermore, three grooves G2 having a depth inclined in an opposite direction to the groove G2 on the worm wheel WW2 along a circular arc direction on an internal cross-section facing the worm wheel WW2 is formed in the cam ring CR2.

The ball B2 is rolling-supported by the groove G2 between the worm wheel WW2 and the cam ring CR2, and configured to cam-operate in conjunction with the rotation of the worm wheel WW2.

The push plate PP2 is fitted with the external circumference of the second drum 21, and an external cross-section thereof is rolling-supported by internal cross-section of the worm wheel WW2 through the bearing BR. Furthermore, a plurality of pushrods PR2 are formed along an internal cross-section of the push plate PP2, and the pushrod PR2 is provided to penetrate a side surface of the second drum 21 and is disposed to face the second pressurizing plate 27.

The wave spring WS2 is located between the side surface of the second drum 21 and the push plate PP2, to provide restoring force to the push plate PP2.

Actuators 41 and 42 as power sources of the first and second operation units PU1 and PU2 may be formed as motors to provide torque to the worm gears WG1 and WG2, respectively.

In the first and second operation units PU1 and PU2, the worm gears WG1 and WG2 rotate the worm wheels WW1 and WW2, respectively, according to rotating operation of the actuators 41 and 42 configured outside of the case 1 and the cover 3.

Accordingly, the balls B1 and B2 cam-operate with respect to the inclined grooves G1 and G2 between the worm wheels WW1 and WW2 and the cam rings CR1 and CR2, respectively, to generate the pressurizing force in the axial direction.

The axial directional pressurizing force is transferred to push plates PP1 and PP2 through the worm wheels WW1 and WW2, respectively, and pushrods PR1 and PR2 push first and second pressurizing plates 17 and 27 inward to control the first and second clutch units CU1 and CU2 to operate to be coupled.

At the present time, the pressurizing forces of the worm wheels WW1 and WW2 and the reaction forces of the cam rings CR1 and CR2 generated by the cam operation of the balls B1 and B2 are supported by first and second separating plates 15 and 25 supported by the internal side of the first and second drums 11 and 21 through the snap ring SR and the external side of the first and second drums 11 and 21 by spacers 31 and 32 supported through catching steps 31 and 32 so that they are cancelled on the first and second drums 11 and 21.

Therefore, the axial directional load by the pressurizing force of the first operation unit PU1 acting on the first clutch unit CU1 does not affect the second clutch unit CU2, and in the same way, the axial directional load by the pressurizing force of the second operation unit PU2 acting on the second clutch unit CU2 does not affect the first clutch unit CU1.

Accordingly, the first and second clutch units CU1 and CU2 are independently controlled without an interference due to the pressurizing force of the first and second operation units PU1 and PU2, to distribute the torque transferred through the drive gear DG to the first and second driveshafts DS1 and DS2 with an increased accuracy of control.

In a driving torque distribution apparatus according to an exemplary embodiment configured as above, the torque transferred from the actuators 41 and 42 through the worm gears WG1 and WG2 is converted to the axial directional pressurizing force by the first and second operation units PU1 and PU2, during which coupling and release control, coupling force control, and the like of the first and second clutch units CU1 and CU2 may be independently performed so that the driving torque transferred to the first and second driveshafts DS1 and DS2 may be controlled precisely and independently.

Figure 5:
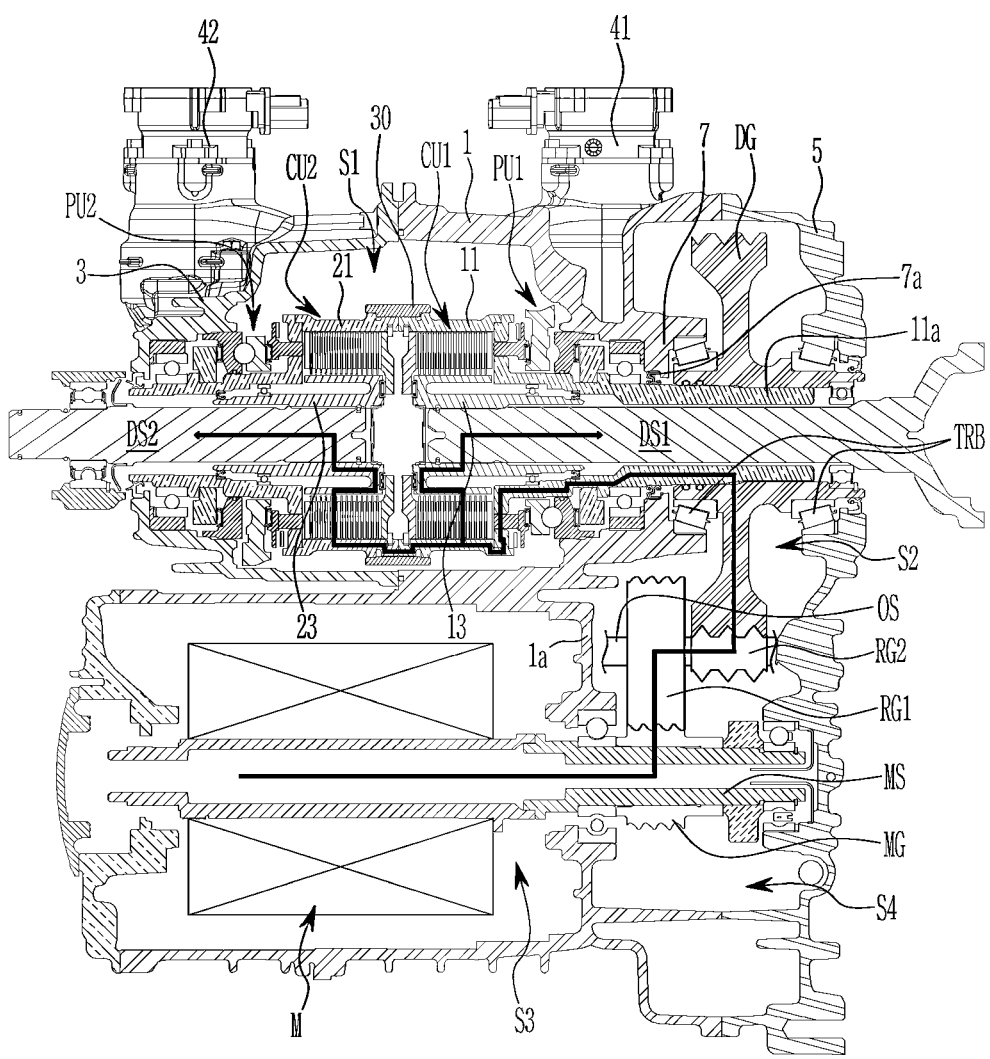
FIG. 5 is a drawing showing a power delivery path of a driving torque distribution apparatus according to an exemplary embodiment of the present disclosure.

FIG. 5 is a drawing showing a power delivery path of a driving torque distribution apparatus according to an exemplary embodiment of the present disclosure.

Referring to FIG. 5, in the driving torque distribution apparatus, the first and second clutch units CU1 and CU2 include a normally released structure by the elastic forces of wave springs WS1 and WS2 of the first and second operation units PU1 and PU2.

First, in the case of normal driving of the vehicle, in the first and second operation units PU1 and PU2, the worm gears WG1 and WG2 rotate the worm wheels WW1 and WW2, respectively, according to rotating operation of the actuators 41 and 42, and the balls B1 and B2 cam-operate with respect to the inclined grooves G1 and G2 between the worm wheels WW1 and WW2 and the cam rings CR1 and CR2, respectively, to generate the pressurizing force in the axial direction.

The axial directional pressurizing force is transferred to the push plates PP1 and PP2 through the worm wheels WW1 and WW2, respectively, and the pushrods PR1 and PR2 push the first and second pressurizing plates 17 and 27 inward to control the first and second clutch units CU1 and CU2 to operate to be simultaneously coupled.

Accordingly, in the first and second clutch units CU1 and CU2, by the pressurizing force of the first and second pressurizing plates 17 and 27, the plurality of first clutch plates CP1 and the plurality of first clutch disks CD1, and the plurality of second clutch plates CP2 and the plurality of second clutch disks CD2 maintain the engaged state.

Accordingly, the driving torque input through the drive gear DG are distributed to the first and second driveshafts DS1 and DS2 in the ratio of 50:50 through the first drum 11, the drum connector 30, the second drum 21, the first and second hubs 13 and 23.

Meanwhile, when different distribution to the driving torque transferred to the first and second driveshafts DS1 and DS2 is required, such as in turning, coasting, or the like, during the driving of the vehicle, the torque of the actuator 41 of the first operation unit PU1, and torque of the actuator 42 of the second operation unit PU2 may be adjusted or blocked depending on driving conditions, and accurate and precise torque transfer may be possible.

That is, when the pressurizing force provided from corresponding operation units PU1 and PU2 is controlled depending on driving conditions, the torque transferred from the first and second clutch units CU1 and CU2 to the first and second driveshafts DS1 and DS2 may be controlled to vary between 0% to 100%.

The driving torque distribution apparatus is an apparatus for driving wheels at both sides of the electric vehicle, and the driving torque from the motor M is transferred to the drive gear DG through the first and second reduction gears RG1 and RG2.

The driving torque is transferred to the first drum 11 of the first clutch unit CU1 connected through the drive gear DG and the extension end portion 11a, and also to the second drum 21 of the second clutch unit CU2 connected through the first drum 11 and the drum connector 30.

Here, the drive gear DG is provided in the space S2 partitioned from the space S1, in which the first and second clutch units CU1 and CU2 and the first and second operation units PU1 and PU2 are provided, through the sealing end portion 7 of the case 1, which forms a partitioned structure.

Furthermore, the drive gear DG is in a state of being spline-coupled to the extension end portion 11a of the first drum 11 to be movable in the axial direction, and has both sides provided on the sealing end portion 7 and the gear cover 5 through the taper roller bearing TRB so that the thrust of the drive gear DG does not affect the operation of the first and second clutch units CU1 and CU2.

Furthermore, in the first and second clutch units CU1 and CU2, the first and second drums 11 and 21 are interconnected to be able to transmit torque through the drum connector 30 and independently controlled by the first and second operation units PU1 and PU2, to distribute the driving torque to the first and second driveshafts DS1 and DS2.

Meanwhile, as shown in FIG. 2, the axial directional pressurizing force due to the first and second operation units PU1 and PU2 is supported at the first and second separating plates 15 and 25 supported by the internal side of the first and second drums 11 and 21 through the snap ring SR, and the reaction force is supported by the external side of the first and second drums 11 and 21 by spacers SP1 and SP2 supported through the catching steps 31 and 32 so that they are cancelled on the first and second drums 11 and 21.

That is, the first and second clutch units CU1 and CU2 are not affected by the axial directional load by the pressurizing force of the first and second operation units PU1 and PU2.

Therefore, a driving torque distribution apparatus according to various exemplary embodiments of the present disclosure may include a rapid response speed when the driving torque of the motor M distributes the torque to both sides wheels, by applying a ball ramp device including balls B1 and B2 which is rolling-supported between worm wheels WW1 and WW2 rotated by worm gears WG1 and WG2 and cam rings CR1 and CR2 fixed in the rotation direction, and configured to generate an axial directional pressurizing force in conjunction with the rotation of the worm wheels WW1 and WW2, as first and second operation units PU1 and PU2 to control first and second clutch units CU1 and CU2.

Accordingly, due to rapid response speed of the first and second clutch units CU1 and CU2, driving performance of the electric vehicle may be improved and performance on traction, handling, and vehicle behavior stability, which are features of a torque vectoring system may also be improved.

Furthermore, the axial directional load due to the pressurizing force of the first and second operation units PU1 and PU2 are cancelled within the drums 11 and 21 by the snap ring SR and the spacers SP1 and SP2 fixed at the internal side and external side of the drums 11 and 21 of the first and second clutch units CU1 and CU2, and therefore the first and second clutch units CU1 and CU2 may be controlled without an interference of the axial directional load.

Accordingly, fatigue in the internal bearings BR may be reduced, a torque transmitted to both wheels may be accurately controlled, and driving stability of the vehicle may be improved while preventing unnecessary loss of driving force.

Furthermore, the first and second clutch units CU1 and CU2 are structured to connect the first and second drums 11 and 21 through the drum connector 30 so that the clutch units CU1 and CU2 may be manufactured by assembling, providing each manufacturing and improving maintainability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving torque distribution apparatus, comprising:
    a first clutch unit including a first drum;
    a second clutch unit; and
    first and second operation units; and
    a drive gear, a worm wheel, a worm gear, and a cam ring,
    wherein the first and second clutch units are configured on axes of first and second driveshafts within a case of an axle of a vehicle, wherein the first and second clutch units are controlled by the first and second operation units, respectively, to independently distribute a driving torque transmitted through the drive gear to the first and second driveshafts,
    wherein, in the first clutch unit, the drive gear is spline-coupled to a frontal end portion of the first drum through an extension end portion formed outward in an axial direction thereof to be movable in the axial direction, and
    wherein the first and second operation units further includes:
        a ball ramp device including a plurality of grooves having inclined depths in opposite directions on corresponding cross-sections of the worm wheel rotated by the worm gear and the cam ring fixed in a rotation direction, the ball ramp device configured to generate an axial directional pressurizing force in conjunction with rotation of the worm wheel as a corresponding ball is rolling-supported by the grooves between the worm wheel and the cam ring.

2. The driving torque distribution apparatus of claim 1, wherein the first clutch unit further includes a first hub spline-coupled to the first driveshaft, and
    wherein the second clutch unit further includes a second drum and a second hub spline-coupled to the second driveshaft,
    wherein the first and second drums are interconnected through a drum connector.

3. The driving torque distribution apparatus of claim 2, wherein the drum connector is spline-coupled to an external circumference of each internal end portion of the first and second drums.

4. The driving torque distribution apparatus of claim 1, wherein the first and second clutch units further include first and second separating plates supported on an internal circumference of each internal side of the first drum and a second drum of the second clutch to support pressurizing force of the first and second operation units.

5. The driving torque distribution apparatus of claim 4, wherein the first and second separating plates are supported through a snap ring on the internal circumference of each internal side of the first drum and the second drum of the second clutch.

6. The driving torque distribution apparatus of claim 4, wherein the first and second operation units further includes a spacer supported by an external diameter surface of each external side of the first drum and a second drum of the second clutch unit to support the axial directional pressurizing force generated by cam-operation of the ball with respect to the inclined grooves between the worm wheel and the cam ring.

7. The driving torque distribution apparatus of claim 1, wherein the first clutch unit further includes:
    the first drum disposed in parallel on an external circumference of the first driveshaft, and spline-coupled to the drive gear through the extension end portion extending in the axial direction at an external frontal end portion;
    a first hub spline-coupled to the first driveshaft in an interior of the first drum and including an external frontal end portion rolling-supported by the first drum;

a plurality of first clutch plates spline-coupled to an internal circumference of the first drum;

a plurality of first clutch disks disposed between the plurality of first clutch plates and spline-coupled to an external circumference of the first hub;

a first separating plate corresponding to the second clutch unit, spline-coupled to an internal side of the internal circumference of the first drum to be supported inward in the axial direction, and including a central circumference rolling-supported by an internal surface of the first hub; and a first pressurizing plate spline-coupled to an external side of the internal circumference of the first drum.

8. The driving torque distribution apparatus of claim 7, wherein the external frontal end portion of the first hub is rolling-supported by the first drum through a bearing, and wherein the first separating plate is supported inward in the axial direction through a snap ring, and the central circumference of the first separating plate is rolling-supported by the internal surface of the first hub through a bearing.

9. The driving torque distribution apparatus of claim 7, wherein the first operation unit includes:

a spacer corresponding to the first clutch unit, fitted with an external circumference of external to the frontal end portion of the first drum, and supported outward in the axial direction by a catching step;

the worm wheel fitted with an external circumference of the first drum to be engaged with the worm gear configured to transfer a torque of an actuator, and having an external cross-section on which a plurality of grooves having a depth inclined in one direction is formed along a circular arc direction;

the cam ring fixed in the rotation direction and supported by the spacer in a state of being fitted with the external circumference of the first drum together with the worm wheel, and having an internal cross-section facing the worm wheel on which a plurality of grooves having a depth inclined in a direction opposite to the groove on the worm wheel are formed along a circular arc direction;

the ball rolling-supported by each groove between the worm wheel and the cam ring to cam-operate in conjunction with the rotation of the worm wheel;

a push plate fitted with the external circumference of the first drum, having an external cross-section rolling-supported by an internal cross-section of the worm wheel, having an internal cross-section along which a plurality of pushrods are formed to penetrate a side surface of the first drum, and disposed to face the first pressurizing plate; and a wave spring located between the side surface of the first drum and the push plate and configured to provide restoring force to the push plate.

10. The driving torque distribution apparatus of claim 9, wherein the external cross-section of the push plate is rolling-supported by the internal cross-section of the worm wheel through a bearing.

11. The driving torque distribution apparatus of claim 9, wherein a bearing is located between the cam ring and the spacer.

12. The driving torque distribution apparatus of claim 1, wherein the second clutch unit includes:

a second drum disposed in parallel on an external circumference of the second driveshaft, and including an external frontal end portion rolling-supported by an internal surface of a cover;

a second hub spline-coupled to the second driveshaft in an interior of the second drum, and including an external frontal end portion rolling-supported by the second drum;

a plurality of second clutch plates spline-coupled to an internal circumference of the second drum;

a plurality of second clutch disks disposed between the plurality of second clutch plates and spline-coupled to an external circumference of the second hub;

a second separating plate corresponding to the first clutch unit, spline-coupled to an internal side of the internal circumference of the second drum to be supported inward in the axial direction, and including a central circumference rolling-supported by an internal surface of the second hub; and a second pressurizing plate spline-coupled to an external side of the internal circumference of the second drum.

13. The driving torque distribution apparatus of claim 12, wherein the external frontal end portion of the second drum is rolling-supported by an internal surface of the cover through a bearing, wherein the external frontal end portion of the second hub is rolling-supported by the second drum through a bearing, and wherein the second separating plate is supported inward in the axial direction through a snap ring, and the central circumference of the second separating plate is rolling-supported by the internal surface of the second hub through a bearing.

14. The driving torque distribution apparatus of claim 12, wherein the second operation unit includes:

a spacer corresponding to the second clutch unit, fitted with an external circumference of an external frontal end portion of the second drum, and supported outward in the axial direction by a catching step;

the worm wheel fitted with an external circumference of the second drum to be engaged with the worm gear configured to transfer a torque of an actuator, and having an external cross-section on which a plurality of grooves having a depth inclined in one direction is formed along a circular arc direction;

the cam ring fixed in the rotation direction and supported by the spacer in a state of being fitted with the external circumference of the second drum together with the worm wheel, and having an internal cross-section facing the worm wheel on which a plurality of grooves having a depth inclined in a direction opposite to the grooves on the worm wheel are formed along a circular arc direction;

the ball rolling-supported by each groove between the worm wheel and the cam ring to cam-operate in conjunction with the rotation of the worm wheel;

a push plate fitted with the external circumference of the second drum, having an external cross-section rolling-supported by an internal cross-section of the worm wheel, having an internal cross-section along which a plurality of pushrods are formed to penetrate a side surface of the second drum, and disposed to face the second pressurizing plate; and a wave spring located between the side surface of the second drum and the push plate and configured to provide restoring force to the push plate.

15. The driving torque distribution apparatus of claim 14, wherein the external cross-section of the push plate is rolling-supported by the internal cross-section of the worm wheel through a bearing.

16. The driving torque distribution apparatus of claim 14, wherein a bearing is located between the cam ring and the spacer.

* * * * *